L. E. HUDSON.
ICE CREAM FREEZER.
APPLICATION FILED JAN. 6, 1910.
1,026,510.
Patented May 14, 1912.
3 SHEETS—SHEET 1.
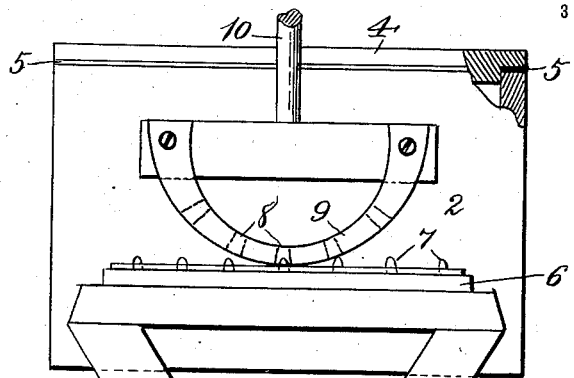
Fig. 1
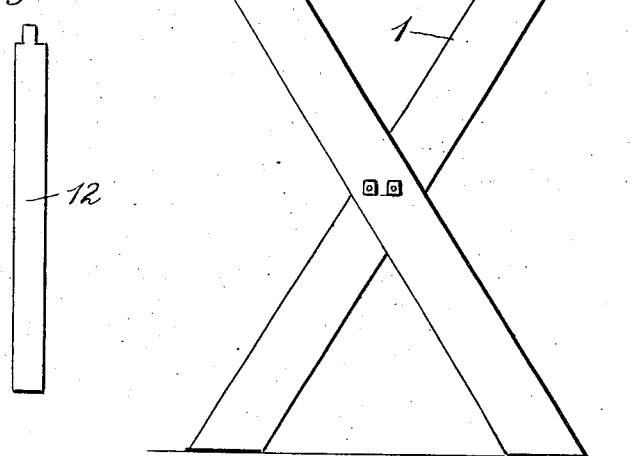
Fig. 6
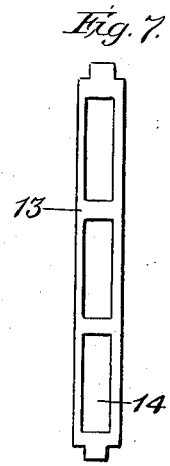
Fig. 7
Fig. 2
Witnesses
J. L. Ourand.
Joseph Sanders.
Inventor
Laura Emma Hudson,
By John A. Saul
Attorney
COLUMBIA PLANOGRAPH CO., WASHINGTON, D. C.

L. E. HUDSON.
ICE CREAM FREEZER.
APPLICATION FILED JAN. 6, 1910.
1,026,510.
Patented May 14, 1912.
3 SHEETS—SHEET 2.
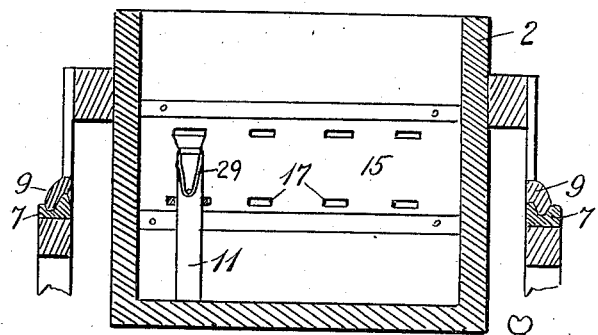
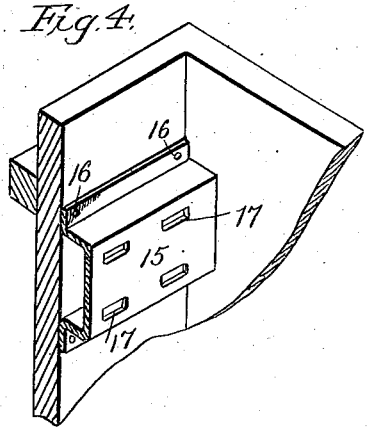
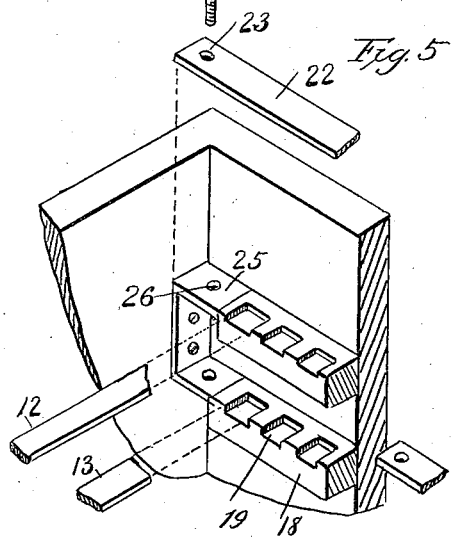
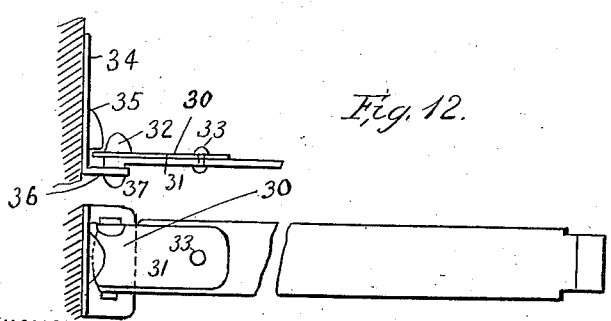
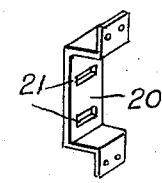
Witnesses
F. L. Ourand
Joseph Sanders
Inventor
Laura Emma Hudson,
By John A. Saul.
Attorney
COLUMBIA PLANOGRAPH CO., WASHINGTON, D. C.

L. E. HUDSON.
ICE CREAM FREEZER.
APPLICATION FILED JAN. 6, 1910.
1,026,510.
Patented May 14, 1912.
3 SHEETS—SHEET 3.
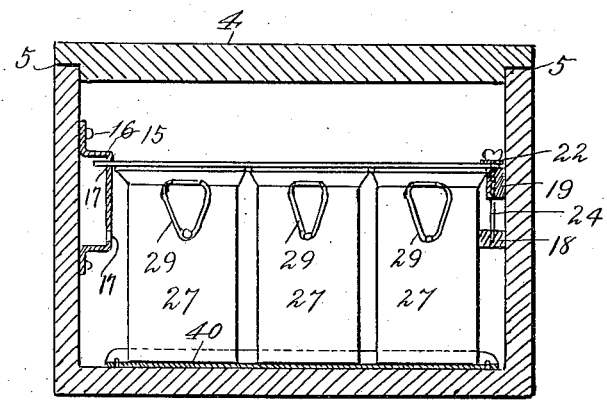
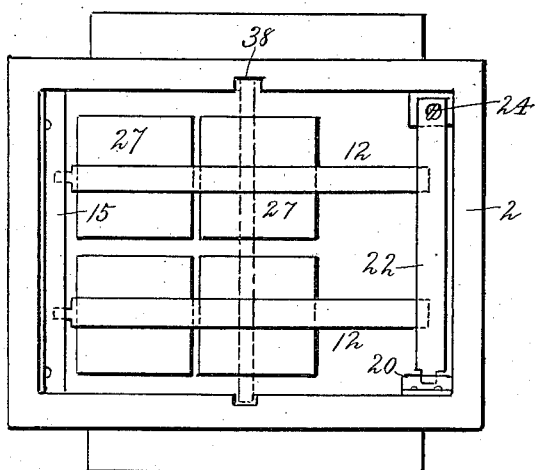
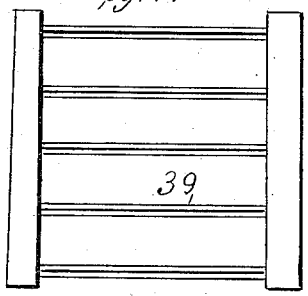
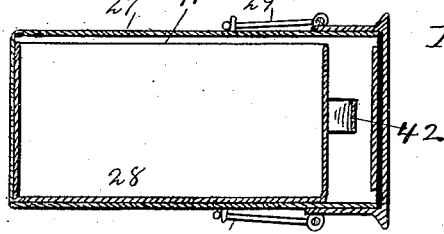
Witnesses
F. L. Ourand
Joseph Sanders
Inventor
Laura Emma Hudson,
By John A. Saul.
Attorney

UNITED STATES PATENT OFFICE.

LAURA EMMA HUDSON, OF LANCASTER, SOUTH CAROLINA, ASSIGNOR TO NORTH POLE ICE CREAM FREEZER COMPANY, OF CHARLOTTE, NORTH CAROLINA, A CORPORATION OF NORTH CAROLINA.

ICE-CREAM FREEZER.

1,026,510.  Specification of Letters Patent. Patented May 14, 1912.

Application filed January 6, 1910. Serial No. 536,769.

*To all whom it may concern:*

Be it known that I, LAURA EMMA HUDSON, a citizen of the United States, residing at Lancaster, in the county of Lancaster and State of South Carolina, have invented certain new and useful Improvements in Ice-Cream Freezers, of which the following is a specification.

My invention relates to ice cream freezers; and more particularly to ice cream brick molding and ice cream block freezing; and is provided with a plurality of cans differing in size, so that a single block may be frozen, or a series of bricks may be molded where various colored bricks are desired, such for instance as that known as the velvet cream.

A primary object of the device is to so construct the same that when the cream is frozen in the cans said cans may be singly or collectively withdrawn from the freezer and the contents thereof placed in a suitable receptacle.

In the drawings forming a part of this specification, and in which like symbols of reference represent corresponding parts in the several views:—Figure 1 is a side view of the device and the supporting stand thereof; Fig. 2 is a longitudinal sectional view; Fig. 3 is a transverse section of the same; Fig. 4 a view of the casing having bearings for securing the ends of the rods; Fig. 5 a view opposite to that of Fig. 4, showing the supporting bars for the other ends of the rods; Fig. 6 a view of one of the top securing bars; Fig. 7 a view of the lower supporting or securing bar, the same having openings therein for reception of the receptacles; Fig. 8 a longitudinal section of a modification, for molding a series of bricks; Fig. 9 a plan view of the modification; Fig. 10 is a sectional view of one of the modified or large cans; Fig. 11 a view of a dasher, which may be employed where the device is used as a churn; and, Fig. 12 views of a modified form of fastener.

1 represents the base or supporting part of the freezer; 2 the receptacle of the same; and 4 the top thereof, having a groove on its edge, 5, to rest on top of the freezer receptacle.

6 are rack-like bars, having teeth 7, adapted to operate in openings 8 formed in segmental supporting side pieces 9; and 10 is a sectional view of a handle or lever for oscillating the device.

11 are the cans for the cream, the same being adapted to be held in place in the freezer by means of bars 12 and 13, the latter having slots 14 for the reception of the cans.

15 is a casing adapted to be secured by nails or the like 16 to the sides of the freezer and having slots 17 formed therein for the reception of the ends of the bars 12 and 13. 18 are supporting bars, having recesses 19 formed in the same for the reception of the other end of the bars 12 and 13; and 20 is a casing similar to casing 15, the same having slots 21 therein for reception of locking rods 22. These rods 22 have an orifice 23 for reception of a screw 24, said screw being for the purpose of locking the rods 22 after the same have been placed in position.

25 is an angle iron, having orifices 26 for the purpose of receiving the screw 24, the lower of said orifices having an internal screw-thread so that the screw 24 may be screwed and held therein.

27 are the larger cans, the same having an inner can 28 telescoping the outer to facilitate the reception of the cream, said inner cans having an open side 41 and a handle 42; and 29 are clasps to hold the tops on the cans.

30 is a latch to be used, if desired, in lieu of the screw-bolt to hold the rods, the same consisting of a strip 31 having a lug 32 to manipulate the same, and having a pivotal connection at 33 to the bar.

34 is a plate, and 35 a lug on the same, with which the strip 31 is adapted to coöperate and be locked beneath the lug.

36 is a perforation in the plate 34 within which a lug 37 is received, said lug depending from the locking bar.

40 is a plate to receive and hold the bottom of the large cans.

38 are vertical grooves in the sides of the freezer, the purpose of the same being to receive a dasher 39 when the device is to be used as a churn. Of course when the machine is used as a churn all the interior mechanism, such as bars, or the like, are removed therefrom.

The operation of the device will be apparent from the foregoing description. The ice and salt are first packed in between the cans and other parts, filling the interior of the freezer, and the machine agitated. After the freezing the cans are removed, and the cream used, as desired.

Having now fully described my invention, what I claim as new, and desire to secure by Letters-Patent, is:—

1. An ice-cream freezer, consisting of a receptacle, cans for the same, a slotted casing supported in the receptacle, a series of bars adapted to be received in the slots, a locking rod to clamp the free ends of the bars, and means for securing the locking rod.

2. An ice-cream freezer, consisting of a receptacle, cans for the same, bars to hold the cans in position, locking bars for the main bars, a lug on the side of the receptacle, and a latch pivoted on the locking bar and adapted to engage the lug on the receptacle.

3. An ice-cream freezer, consisting of a receptacle, cans for the same, a slotted casing supported in the receptacle, perforated bars adapted to be received in the slots, supporting means for the other ends of the bars, bars adapted to be supported in the slotted casing and contact with the tops of the cans, and locking means for the bars.

In testimony whereof I affix my signature in presence of two witnesses.

LAURA EMMA HUDSON.

Witnesses:
W. P. BENNETT,
W. R. MOORE.

Copies of this patent may be obtained for five cents each, by addressing the "Commissioner of Patents. Washington, D. C."